(12) United States Patent
Choi (10) Patent No.: US 8,597,824 B2
(45) Date of Patent: Dec. 3, 2013

(54) LITHIUM SECONDARY BATTERY

(75) Inventor: Woohyuk Choi, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1410 days.

(21) Appl. No.: 11/646,447

(22) Filed: Dec. 28, 2006

(65) Prior Publication Data

US 2007/0154781 A1 Jul. 5, 2007

(30) Foreign Application Priority Data

Dec. 29, 2005 (KR) .................. 10-2005-0134530

(51) Int. Cl.
*H01M 2/04* (2006.01)
*H01M 2/08* (2006.01)
*H01M 2/12* (2006.01)

(52) U.S. Cl.
USPC ............. 429/175; 429/61; 429/174; 429/176; 429/185

(58) Field of Classification Search
USPC .................................. 429/174, 175, 185, 61
See application file for complete search history.

(56) References Cited

U.S. PATENT DOCUMENTS

| | | | |
|---|---|---|---|
| 3,713,896 A | 1/1973 | Feldhake | |
| 5,919,274 A | 7/1999 | Tuttle | |
| 5,993,990 A * | 11/1999 | Kanto et al. | 429/62 |
| 6,255,016 B1 * | 7/2001 | Kim | 429/174 |
| 6,730,430 B2 * | 5/2004 | Chang | 429/53 |
| 7,223,496 B2 * | 5/2007 | Takahashi et al. | 429/171 |
| 7,582,379 B2 * | 9/2009 | Yoon et al. | 429/163 |
| 2006/0115713 A1 * | 6/2006 | Kim et al. | 429/61 |
| 2006/0121336 A1 * | 6/2006 | Yoon | 429/53 |

FOREIGN PATENT DOCUMENTS

| | | |
|---|---|---|
| CN | 1245980 A | 3/2000 |
| EP | 0 005 823 | 5/1979 |
| EP | 0 081 201 | 12/1982 |
| EP | 0 977 290 A1 | 2/2000 |
| EP | 1 443 573 | 4/2004 |
| GB | 2200792 A | 8/1988 |
| JP | 60-230355 | 11/1985 |
| JP | 61-173451 A | 8/1986 |
| JP | 63-195951 A | 8/1988 |
| JP | 5-190159 A | 7/1993 |
| JP | 6-020664 A | 1/1994 |
| JP | 10-302753 | 11/1998 |
| JP | 11-238494 A | 8/1999 |
| JP | 2001-023585 | 1/2001 |
| JP | 2001-155699 | 6/2001 |
| JP | 2002-100330 A | 4/2002 |
| JP | 2006-066313 A | 3/2006 |
| KR | 2001-76250 | 8/2001 |
| KR | 10-0352083 B1 | 8/2002 |

OTHER PUBLICATIONS

Chinese Office Action dated Feb. 21, 2011 for Chinese Patent Application No. CN 200610156359.3 related to the captioned application.

* cited by examiner

*Primary Examiner* — John S Maples
(74) *Attorney, Agent, or Firm* — Knobbe, Martens, Olson & Bear LLP (57) ABSTRACT

A lithium secondary battery includes a supporting sealing member between a safety vent and a gasket to enhance a safety of the lithium secondary battery by preventing a gas or an electrolyte from leaking.

21 Claims, 5 Drawing Sheets

LITHIUM SECONDARY BATTERY

CROSS-REFERENCE TO RELATED APPLICATION

This application claims the benefit of Korean Application No. 2005-134530, filed on Dec. 29, 2005 in the Korean Intellectual Property Office, the disclosure of which is incorporated herein by reference.

BACKGROUND OF THE INVENTION

1. Field of the Invention

Aspects of the present invention relate to a lithium secondary battery. More particularly, aspects of the present invention relate to a lithium secondary battery with a supporting sealing member between a safety vent and a gasket to enhance safety of the lithium secondary battery by reducing or preventing a gas or an electrolyte from leaking from the lithium secondary battery.

2. Description of the Related Art

Lithium secondary batteries may be classified as a cylindrical lithium secondary battery and a rectangular lithium secondary battery according to an exterior shape. The cylindrical lithium secondary battery has a built-in current limiting structure in a cap assembly to stop a current generating reaction when an internal pressure of the battery is raised above a certain limit and when there is a risk of explosion. Accordingly, the structure enhances the safety of the lithium secondary battery.

Figure 7:
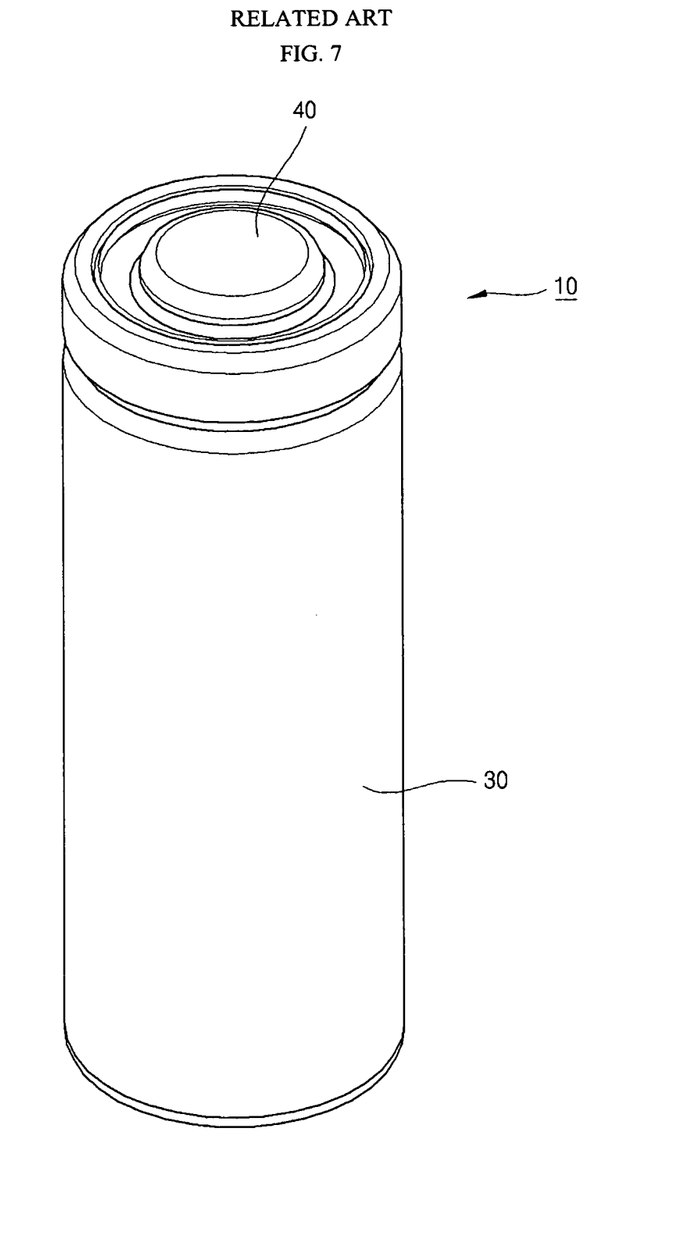
FIG. 7 illustrates a perspective view of a related art lithium secondary battery.

The cylindrical lithium secondary battery 10, as shown in FIG. 7, is composed of an electrode assembly (not shown) in the interior, a cylindrical can 30 that receives the electrode assembly and an electrolyte, and a cap assembly 40 that is assembled in the upper side of the cylindrical can 30 and seals the cylindrical can 30 to divert the current generated from the electrode assembly to an external device.

The related art cap assembly 40 is configured to have the following elements be sequentially inserted into the cylindrical can 30. The elements include a gasket, a safety vent, a current isolation member, a secondary protective element, and a cap up. Once each element is inserted into the cylindrical can 30 in the order discussed above, a rim of the cylindrical can 30 is crimped to keep the elements in place and prevent the gas and the electrolyte from leaking. However, with only this configuration, there is a risk of separation between the safety vent and the gasket and a risk of leakage when the internal pressure of the battery 10 is raised since a complete seal is not formed. Also, if the electrolyte flows into a slight gap between the cap assembly 40 and the gasket or between the gasket and the cylindrical can 30, due to an impact, a jolt, etc., there is a risk of electrolyte leakage out of the battery by interaction of a capillary phenomenon and a cohesive power of the electrolyte, etc.

SUMMARY OF THE INVENTION

Accordingly, aspects of the present invention relate to the problems as described above, and/or other problems, and aspects of the present invention improve tightness or a seal in a battery by inserting or forming an adhesive material between a safety vent and a gasket, and/or between the safety vent and a shaped can to reduce or prevent the gas or the electrolyte of the battery from leaking. Other aspects of the present invention have other benefits.

The lithium secondary battery according to aspects of the present invention includes a electrode assembly, a cylindrical can to receive the electrode assembly, a cap assembly which closes an opening of the can and includes a current isolation member and a cap up connected to the current isolation member, a gasket disposed between the cap assembly and the can to maintain tightness or an airtight seal, and a supporting sealing member formed between the safety vent and the gasket.

Also, the supporting sealing member according to an aspect of the present invention may be formed of at least one of a rubber, a silicone, and a polymer.

Also, the supporting sealing member according to an aspect of the present invention may have an annular shape with a round hole in the center.

Also, the supporting sealing member according to an aspect of the present invention may comprise an exterior end formed in a width direction and extended over an interface where the gasket and the cap assembly contact each other.

Also, the supporting sealing member according to an aspect of the present invention may be formed between the gasket and the cylindrical can.

Also, the supporting sealing member according to an aspect of the present invention may include an adhesive layer, wherein the adhesive layer is formed on a double sided tape or is formed by solidification after a fluid amorphous adhesive is inserted between the safety vent and the gasket.

Also, the gasket according to an aspect of the present invention may be formed of at least one of a polyethylene, a polyethylene, and a polyimide.

Also, the cap assembly according to an aspect of the present invention may be formed as a single piece that includes the current isolation member and the cap up.

Also, the current isolation member according to an aspect to the present invention may include at least one of copper or a copper alloy, and the conductive layer may be formed by a plating process.

Also, the secondary protective element according to an aspect to the present invention may be attached to an upper side of the safety vent.

Also, the secondary protective element according to an aspect to the present invention may be a positive temperature coefficient (PTC) element formed of a layer of resin and carbon powder.

According to an aspect of the present invention, a rechargeable battery includes a receptacle having an opened end and containing electrolyte, a cap to close the opened end, a gasket interposed between the receptacle and the cap, and a sealer interposed between the receptacle and the cap to hinder leakage of any produced gas and/or capillary phenomenon leakage of electrolyte.

According to an aspect of the present invention, a rechargeable battery includes a can, a safety vent to couple with the can, a gasket interposed between the can and the safety vent, and a sealing member interposed between the safety vent and the gasket and/or the can and the gasket to enhance a seal and strengthen the attachment thereof.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which.

DETAILED DESCRIPTION OF THE EMBODIMENTS

Reference will now be made in detail to aspects of the present invention, examples of which are illustrated in the accompanying drawings, wherein like reference numerals refer to the like elements throughout. The aspects are described below in order to explain the present invention by referring to the figures.

Figure 1:
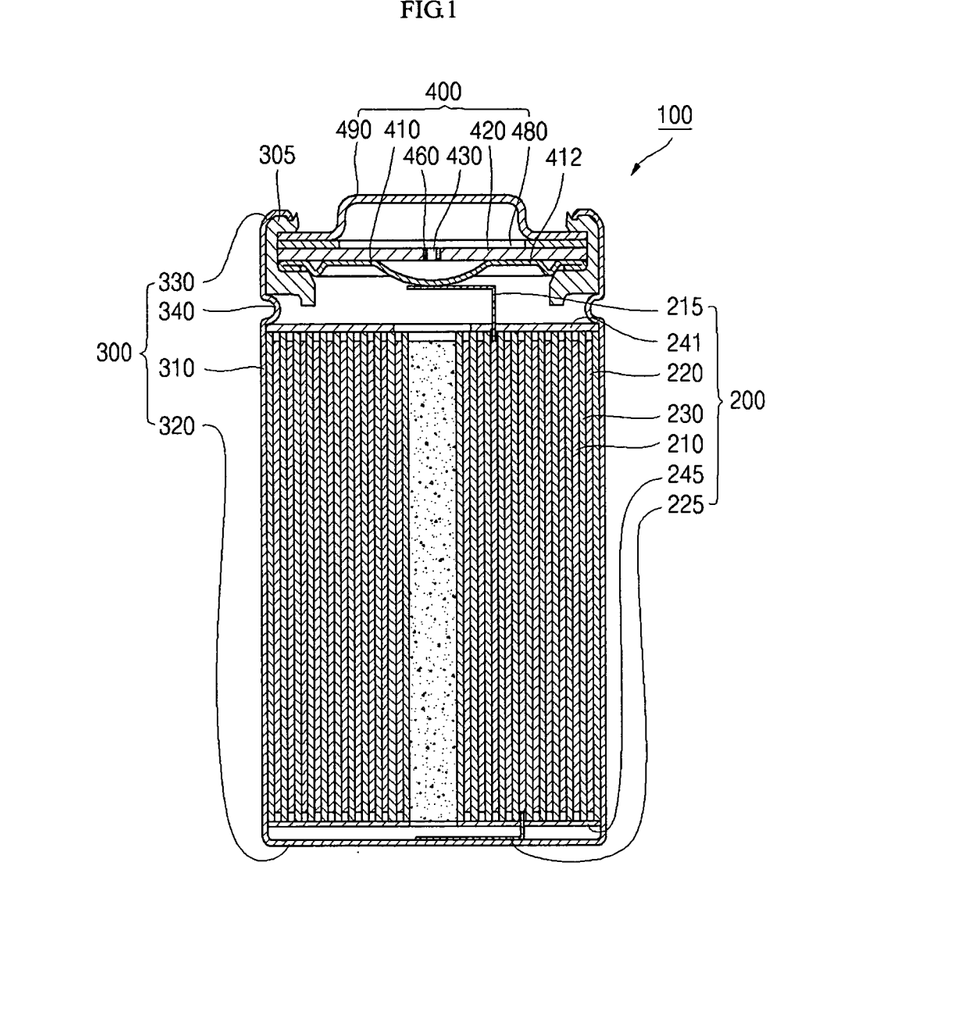
FIG. 1 illustrates a cross-sectional view of a lithium secondary battery according to an aspect of the present invention.
Figure 2:
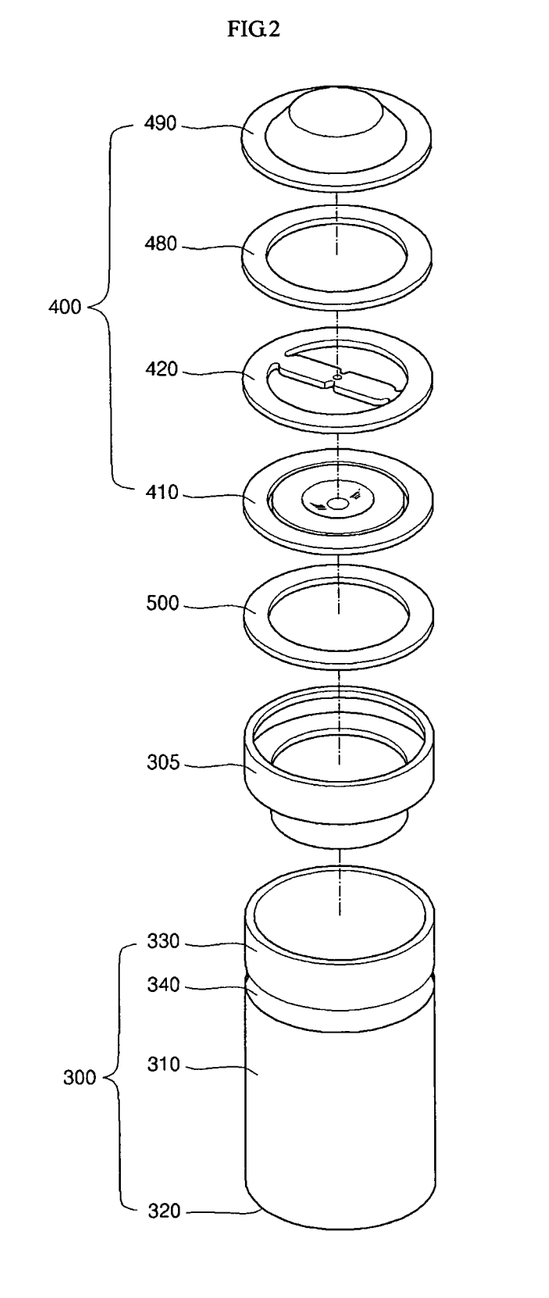
FIG. 2 illustrates an exploded view of a lithium secondary battery according to an aspect of the present invention.
Figure 3:
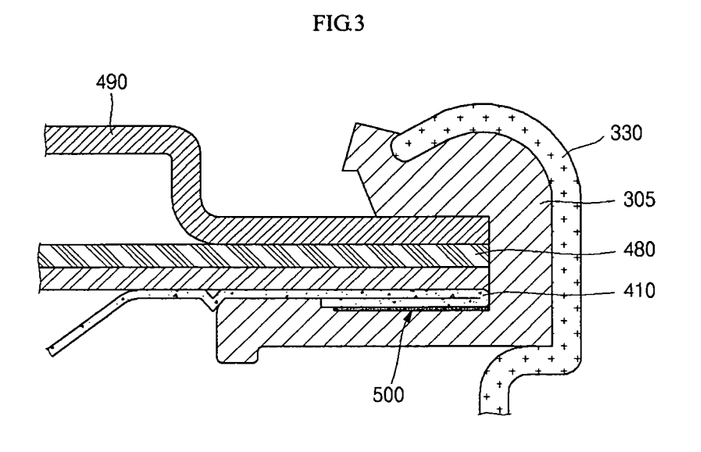
FIG. 3 illustrates a cross-sectional portion of a lithium secondary battery according to an aspect of the present invention.
Figure 4:
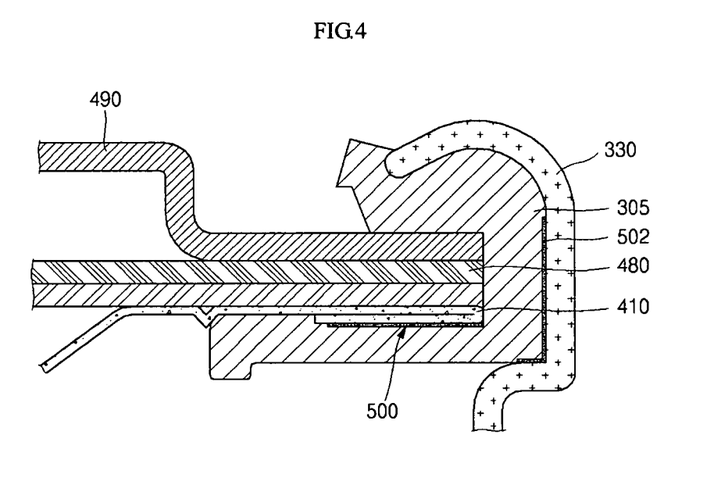
FIG. 4 illustrates a cross-sectional portion of a lithium secondary battery according to another aspect of the present invention.
Figure 5:
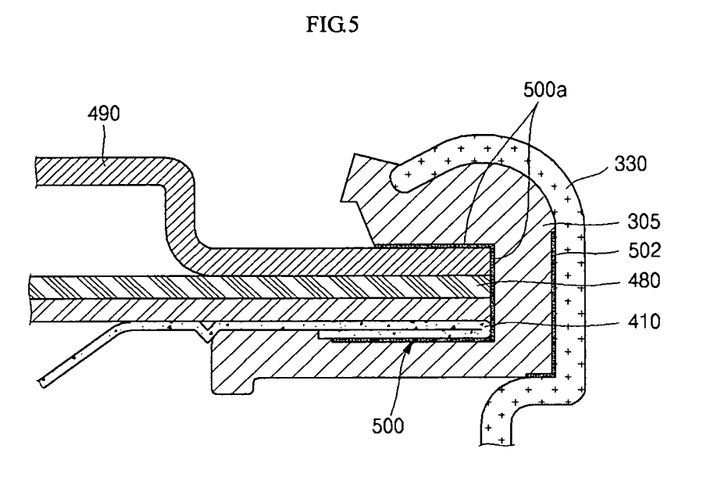
FIG. 5 illustrates a cross-sectional portion of a lithium secondary battery according to another aspect of the present invention.
Figure 6:
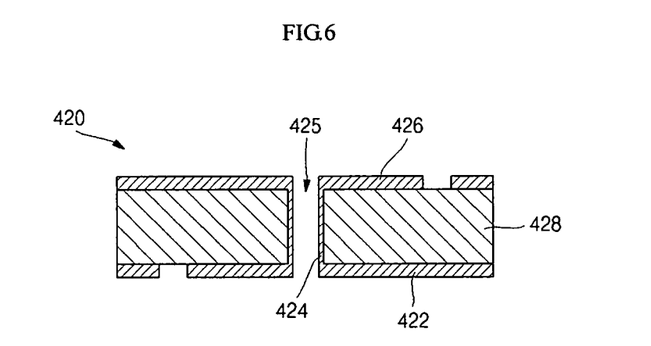
FIG. 6 illustrates a cross-sectional view of a current isolation member according to an aspect of the present invention.

FIG. 1 illustrates a cross-sectional view of a lithium secondary battery 100 according to an aspect of the present invention. FIG. 2 is an exploded view of the lithium secondary battery according to an aspect of the present invention. FIG. 3 is a cross-sectional portion of the lithium secondary battery according to an aspect of the present invention. FIG. 4 is a cross-sectional portion of the lithium secondary battery according to another aspect of the present invention. FIG. 5 is a cross-sectional portion of the lithium secondary battery according to another aspect of the present invention. FIG. 6 is a cross-sectional view of the current isolation member according to an aspect of the present invention.

As shown in FIG. 1, the cylindrical secondary battery 100 (cylindrical lithium secondary battery or the battery) includes an electrode assembly 200, a cylindrical can 300 (or receptacle) which receives the electrode assembly 200 and an electrolyte, and a cap assembly 400 (or a cap) which is assembled in the upper side of the cylindrical can 300 to seal the cylindrical can 300 and divert the current generated from the electrode assembly 200 to an external device.

As shown in FIG. 1, the electrode assembly 200 is formed into a jelly roll shape by winding a positive electrode plate 210 to which the positive electrode active material layer is coated, the negative electrode plate 220 to which the negative electrode active material layer is coated, and the separator 230 which is positioned between the positive electrode plate 210 and the negative electrode plate 220. The positive electrode plate 210 is a thin film having good conductivity. In a non-limiting aspect, the positive electrode plate 210 includes a positive current collector that includes an aluminum (Al) foil and a positive electrode active material layer which is coated to both surfaces of the positive electrode plate 210. The positive current collector has a region on which the positive electrode active material is not coated. Such a positive uncoated region is formed at both ends of the positive electrode plate 210. One end of the positive uncoated region is made of Al and is connected to a positive tap 215 which protrudes away from the electrode assembly 200 (in FIG. 1, the upward or outward direction from the interior) and has a specific length.

Also, the negative electrode plate 220 is a thin film, such as a conductive metal. In a non-limiting aspect, the positive electrode plate 220 includes a negative current collector that includes a copper (Cu) foil and/or a nickel (Ni) foil and a negative electrode active material layer which is coated to both surfaces of the negative electrode plate. The negative current collector has a region on which the negative electrode active material is not coated. Such a negative uncoated region is formed at both ends of the negative electrode plate 220. One end of the negative uncoated region is made of Ni and is connected to a negative tap 225 which protrudes away from the electrode assembly 200 (In FIG. 1, the downward or outward direction from the interior) and has a specific length. In the upper side and the lower side of the electrode assembly 200, respective insulating plates 241, 245 may be provided to prevent a contact of the electrode assembly 200 with the respective cap assembly 400 and the cylindrical can 300.

As shown in FIGS. 1 and 2, the cylindrical can 300 (or can) includes the cylindrical side plate 310 which has a specific diameter, and the bottom plate 320 which seals off the bottom side of the cylindrical side plate 310. Accordingly, a predetermined space is formed within the cylindrical can 300 in which the cylindrical electrode assembly 200 is accommodated. The cylindrical can 300 also includes an opening, in which the electrode assembly 200 is inserted, on the upper side of the cylindrical side plate 310. The cylindrical can 300 self serves as a negative electrode of the lithium secondary battery 100 since the negative tap 225 is connected to the central region of the bottom plate 320 of the cylindrical can 300. In a non-limiting aspect, the cylindrical can 300 is made of aluminum (Al), iron (Fe), or an alloy thereof. Furthermore, the cylindrical can 300 includes a clipping 330 (or a bent portion as shown in FIG. 2) which is bent inward to press down on the upper side of the cap assembly 400 (as shown in FIG. 1). Also, the cylindrical can 300 includes a beading 340 which is formed at a position spaced from the clipping 330 by a specific distance corresponding to a thickness of the cap assembly 400. The beading 340 is concaved to press (or help support) the bottom side of the cap assembly 400.

As shown in FIGS. 1 and 2, the cap assembly 400 includes a safety vent 410, a current isolation member 420, a secondary protective element 480, and a cap up 490 (also referred to as a cap top). The safety vent 410 is positioned towards the lower side of the cap assembly 400. The safety vent 410 includes a protrusion that protrudes from the central region (in FIGS. 1 and 2, the downward direction or the inward direction towards the interior of the can 300). The protrusion is designed to be transformed by being pushed upward (or the outward direction away from the interior of the can 300) by a pressure when a gas is generated in the cylindrical lithium secondary battery 100. Also, the positive electrode plate 210 and the negative electrode plate 220 of the electrode assembly 200 are electrically connected to the cap assembly 400 and the can 300, respectively. For example, the positive tap 215 is welded onto the lower surface of the safety vent 410 to electrically connect the safety vent 410 and the positive electrode plate 210. Similarly, the negative tap 225 is contacted with the can 300 to electrically connect the can 300 and the negative electrode plate 220.

In a non-limiting aspect, the cap assembly 400 may include a single piece element that combines the current isolation member 420 and the safety vent 410. In various aspects, the current isolation member 420 and the secondary protective element 480 may be laminated onto the safety vent 410 in sequence, and the cap up 490 may be applied thereon to form the cap assembly 400 in a manner similar to a related art. In other aspects, the safety vent 410, the current isolation member 420, and the secondary protective element 480 may be formed as a single piece to reduce the volume, the weight, and the contact resistance.

In non-limiting aspects shown in FIGS. 2 and 6, the current isolating member 420 includes a lower conductive thin film 422, a via hole 425, an upper conductive thin film 426, and a main body 428. In a non-limiting aspect, the conductive thin films 422, 426 of the current isolation member 420 are copper, a copper alloy, or any combinations thereof. Copper is a good conductor and has very high conductivity. In another non-limiting aspect, the conductive thin films (or layers) are made by a plating process for its ease of thickness control and simplicity.

In a non-limiting aspect, the secondary protective element 480 may be attached to the safety vent 410 as shown in FIG. 1. The current isolation member 420 may be seated on the upper surface of the safety vent 410 and electrically connected thereto. Accordingly, current flowing into the safety vent 410 flows through the lower conductive thin film 422, along the via hole 425, and the upper conductive thin film 426. Also, the secondary protective element 480 is seated onto the upper side of the current isolation member 420 and electrically connected to the upper conductive thin film 426 for the current to flow. Also, the cap up 490 is electrically connected to the upper side of the secondary protective element 480 for the current to flow from the secondary protective element 480 to the outside of the lithium secondary battery 100.

In a non-limiting aspect, the secondary protective element 480 may be formed of a positive temperature coefficient (PTC) element comprising a resin and a carbon powder. In this aspect, the resin serves as a binder and the carbon powder serves as a conductor. If the temperature is raised due to a short, an over-charge, and/or an over-discharge of the battery 100, the flow of current will be cut because the resin will expand and distances between the carbon powder will lengthen.

In non-limiting aspects shown in FIGS. 1 and 2, a gasket 305 is formed between the cylindrical can 300 and the cap assembly 400. The material of the gasket 305 maybe a polymer and/or a resin. In a non-limiting aspect, the gasket 305 may be polyethylene (PE), polypropylene (PP), polyimide (PI), or any combinations thereof.

Polyethylene is light and has low density. It is easily extended because the molecular arrangement is not rigid. Polyethylene has a relatively low tensile strength and high impact-resistance. Polyethylene is easy to process and use. Also, polyethylene has good electric insulation properties because it is made of repeating units of $CH_2$ only, and is well suited as a high frequency insulation material because it is symmetrical about a chain of carbon (C).

Polypropylene is generated together with ethylene when naphtha is decomposed. Polypropylene has an isotactic structure and is arranged in the same direction as that of the methyl group. Although crystallinity of polypropylene is high, it is reduced after forming. The electrical properties of polypropylene and polyimide are similar to those of polyethylene.

As shown in FIGS. 2 and 3, a supporting sealing member 500 (also referred to as a sealing support member) is formed between the gasket 305 and the safety vent 410. In a non-limiting aspect, the supporting sealing member 500 may be formed of rubber, silicone, polymer, or any combinations thereof. In various aspects, the supporting sealing member 500 may be annular in shape with a round hole in the center.

In various aspects, the supporting sealing member 500 may be implemented in various forms. It may be formed as an annular ring, an annular ring with a coating of adhesives, an adhesive film, a tape, or any combinations thereof. Also, in various aspects, several of the supporting sealing members 500 may be used, each of which may be the same or different in form.

In a non-limiting aspect, the supporting sealing member 500 may be an annular ring with an adhesive layer coating having a predetermined adhesiveness. The supporting sealing member 500 functions to attach the safety vent 410 and the gasket 305 together. In this aspect, the supporting sealing member 500 may be a double sided tape, wherein the adhesive layer (or material) is applied to the two (or separate) sides of a base material, such as tape. In a preferable, but a non-required aspect, the base is a silicon (Si) resin (or silicone).

In a non-limiting aspect, the silicon resin (or silicone) is a thermoplastic synthetic resin, and may be a polymer of an organic derivative of the silicon. Generally, a normal plastic has a backbone formed of carbon. However, the silicon resin has a backbone formed of silicon in the shape of a siloxane bond (Si—O bond) with added organic groups such as phenyl and/or hydroxyl groups. The silicon resin has a covering power (coverage or spreading power) sufficient for use as a mold release. Also, the silicon resin has good insulating property, and has the best heat resistance when the attached organic group is of a methyl group. When the methyl group is replaced with an alkyl group or an aryl group, mechanical strength of the silicon resin is increased but the electric performance is weakened. Also, silicon resin is an insulation material which resists high temperatures for a long time. Therefore, silicon resin is suitable for the base of the double sided tape, since the silicon resin has good covering power, good thermal-resistance, and good insulating property.

In a non-limiting aspect, the supporting sealing member 500 may be implemented as an adhesive layer formed from an amorphous adhesive possessing fluidity. In this aspect, the cylindrical can 300 and the gasket 305, or the safety vent 410 and the gasket 305, may be strongly attached to each other by applying the adhesive. Also, in another aspect, a gap between the cylindrical can 300 and the gasket 305, or between the safety vent 410 and the gasket 305 may be filled or sealed by applying the adhesive. In various aspects, the adhesive may be a liquid phase adhesive, a gel adhesive, or something similar.

In various aspects, the supporting sealing member 500 may be placed between the can 300 and the cap assembly 400. In the aspect shown in FIG. 3, the supporting sealing member 500 is placed between the gasket 305 and the safety vent 410. In another aspect, the supporting sealing member 500 may be lengthened so that an exterior end in the width direction thereof is extended and is formed over a portion or a periphery of the cap assembly 400. That is, referring to FIG. 5, the supporting sealing member 500 is configured so that the radius of the supporting sealing member 500 is extended and the supporting sealing member 500 is made to surround the lateral side (outside annular edge) of the cap assembly 400 by a portion 500a. The upper side of the battery 100 is closed by crimping the upper opening of the cylindrical can 300 to form a crimping 330 that faces inward in the direction of the gasket 305. Accordingly, the cylindrical can 300, the gasket 305, and the cap up 490 are pressed on the outside of the gasket 305 and the gasket 305 and the safety vent 410 are tightened (or pressed) to the inside of the gasket 305.

As shown, the upper end opening of the cylindrical can 300 and the gasket 305 are strongly tightened (or pressed together) on the outside. Nevertheless, a sealing on the inside may be improved. Therefore, in order to improve the seal, the radius of the supporting sealing member 500 is extended to cover the lateral surface of the cap assembly 400, in various aspects of the present invention.

Furthermore, a supporting sealing member 502 similar to the supporting sealing member 500 may be formed between the cylindrical can 300 and the gasket 305. Referring to FIG. 4 and FIG. 5, the supporting sealing member 502 is formed where the opening of the cylindrical can 300 and the gasket 305 are attached (or pressed) on a side opposite the gasket 305 from the supporting sealing member 500 that is formed between the gasket 305 and the safety vent 410.

In the non-limiting aspect shown in FIGS. 4 and 5, the supporting sealing member 502 is formed between the can 300 and the gasket 305 while the supporting sealing member 500 is formed between the safety vent 410 and the gasket 305. In a non-limiting aspect, one or both of the supporting sealing members 500, 502 may be made of rubber, silicone, polymer, or any combinations thereof. Also, similar to the supporting sealing member 500, the supporting sealing member 502 may include an adhesive layer which has a predetermined adhesiveness, may have the adhesive layer formed on a double sided tape, or may be an amorphous adhesive which has fluidity. In a non-limiting aspect, the supporting sealing member 500 and the supporting sealing member 502 may be formed in a similar or different manner.

Also, it is preferable, but not required, that the supporting sealing member 502 has an annular shape with a hole in the center, which is the same as that of the supporting sealing member 500 (adhesive layer) formed between the gasket 305 and the safety vent 410. It is advantageous, but not required, that the convex (or protrusion) of the safety vent 410 is positioned into the lithium secondary battery 100 so that the safety vent 410 is deformable upward (or outward) when the internal pressure is raised by gas generated in the battery.

In view of the above descriptions, an operation of the lithium secondary battery having the supporting sealing member according to various aspects of the present invention, will be explained.

Referring to FIG. 2 and FIG. 3, the supporting sealing member 500 is formed between the gasket 305 and the safety vent 410. In the non-limiting aspect shown, the supporting sealing member 500 is a double sided tape, wherein one side surface of the double sided tape is attached to a part of the gasket 305 and the other side surface of the double sided tape is attached to a part of the safety vent 410. In another aspect, if the supporting sealing member 500 is a liquid phase or gel adhesive, then the supporting sealing member 500 is attached to the same position as that of the double sided tape to connect (glue or seal) the gasket 305 and the safety vent 410 together while drying.

Referring to FIG. 4, the supporting sealing member 500 is formed between the gasket 305 and the safety vent 410, and the supporting sealing member 502 is formed between a part of the gasket 305 and a part of the inner surface of the upper end opening 330 of the can 300. Referring to FIG. 5, which is otherwise identical to FIG. 4, the supporting sealing member 500 is formed over more of the interface where the cap assembly 400 and the gasket 305 are in contact, by extending the supporting sealing member 500 by a portion 500a.

The battery 100 accommodates the electrode assembly 400 and tightens an edge thereof over the cap assembly 400 by a crimping 330 (or a crimp) that transforms (or bends) the upper end opening of the cylindrical can 300 towards the inside of the lithium secondary battery 100. With the crimping (or crimp), there is still a risk that gas or electrolyte will leak through a slight gap (or a tight gap) present between the gasket 305 and the safety vent 410, between the gasket 305 and the upper end opening 330 of the can 300, and/or the gasket 305 and the electrode assembly 400. When gas is generated from the battery and reaches the slight gap, there is risk of a leakage. To reduce or prevent (or hinder) the leakage, supporting sealing members 500 and/or 502 are formed at the slight gap to reduce or prevent the gas and/or electrolyte from going through the slight gap. The supporting sealing members 500 and/or 502 seal the gap between the supporting sealing member 500, 502 and the cap assembly 400 and the cylindrical can 300, respectively, and/or tighten the attachment. Therefore, the gas leakage is reduced and/or prevented.

Also, the supporting sealing members 500 and/or 502 that are formed at the slight gap reduce and/or prevent leakage of the electrolyte reaching the gap that may be caused by cohesive power of the electrolyte and capillary phenomenon. Accordingly, electrolyte leakage is reduced and/or prevented.

Various aspects of the present invention are applicable to any type or shaped batteries, including any that are rechargeable or non-rechargeable and/or rectangular or hexagonal. Also, the adhesives or the tape may be preformed on the cap assembly, the gasket, and/or the can.

In various aspects, reference to downward or upward directions should not be limited to a particular orientation of the battery or components, but should also be used in view of inward or outward directions, and/or other directions, which may be independent of the particular orientation of the battery or components.

According to aspects of the present invention, one or more of the supporting sealing members are formed between the safety vent and the gasket, and/or between the cylindrical can and the gasket to enhance a seal and tightness therebetween and safety of the lithium secondary battery.

Although a few aspects of the present invention have been shown and described, it would be appreciated by those skilled in the art that changes may be made in the aspects without departing from the principles and spirit of the invention, the scope of which is defined in the claims and their equivalents.

What is claimed is:

1. A lithium secondary battery comprising:
an electrode assembly;
a can to receive the electrode assembly;
a cap assembly including:
a safety vent to close an opening of the can, the safety vent having a central region that protrudes inward and is deformable outward by an internal pressure of the battery, the safety vent comprising a top surface, a bottom surface and a thin side surface,
a current isolation member having an upper side, and
a cap up connected to the upper side of the current isolation member;
a gasket disposed between the cap assembly and the can to maintain an airtight seal, the gasket having horizontal and vertical surfaces; and
a first supporting sealing member formed between the safety vent and the gasket, wherein the first supporting sealing member forms a seal between the safety vent and the gasket and a first surface of the first supporting sealing member contacts only the bottom surface of the safety vent and a second surface of the first supporting sealing member contacts a horizontal surface of the gasket.

2. The lithium secondary battery according to claim 1, wherein the supporting sealing member is formed of at least one of a rubber, a silicone, and a polymer material.

3. The lithium secondary battery according to claim 1, wherein the supporting sealing member has an annular shape with a round hole in the center thereof.

4. The lithium secondary battery according to claim 1, further comprising a second supporting sealing member formed between the gasket and the can.

5. The lithium secondary battery according to claim 1, wherein the first supporting sealing member is formed of an adhesive layer.

6. The lithium secondary battery according to claim 5, wherein the first supporting sealing member comprises a double sided tape having the adhesive layer formed on both sides thereof.

7. The lithium secondary battery according to claim 6, wherein the double sided tape is silicone.

8. The lithium secondary battery according to claim 5, wherein the adhesive layer is formed by inserting an amorphous fluid adhesive between the safety vent and the gasket and solidifying the amorphous fluid adhesive.

9. The lithium secondary battery according to claim 1, wherein the gasket is formed of at least one of a polyethylene, a polypropylene, and a polyimide.

10. The lithium secondary battery according to claim 1, wherein the cap assembly includes a single piece current isolation member and cap up.

11. The lithium secondary battery according to claim 1, wherein the current isolation member includes a conductive layer of at least one of copper and a copper alloy.

12. The lithium secondary battery according to claim 11, wherein the conductive layer is formed by a plating process.

13. The lithium secondary battery according to claim 1, wherein a secondary protective element is attached to the safety vent at an upper side thereof.

14. The lithium secondary battery according to claim 13, wherein the secondary protective element is a positive temperature coefficient (PTC) element formed of a layer of resin and carbon powder.

15. A rechargeable battery, comprising:
a receptacle having an opened end and containing electrolyte;
a cap to close the opened end;
a gasket interposed between the receptacle and the cap, the gasket having horizontal and vertical surfaces; and
a sealer interposed between the gasket and the cap, wherein the sealer forms a seal between the gasket and the cap to hinder leakage of at least one of a gas and the electrolyte,
wherein the cap includes a safety vent having a top surface, a bottom surface and a side surface, and the sealer is disposed between the safety vent and the gasket and contacts only the bottom surface of the safety vent and contacts a horizontal surface of the gasket.

16. The rechargeable battery of claim 15, further comprising another sealer interposed between the gasket and the receptacle.

17. The rechargeable battery of claim 15, wherein the sealer is tape having an adhesive on both sides thereof.

18. The rechargeable battery of claim 17, wherein the tape is formed of silicone.

19. The rechargeable battery of claim 15, wherein the sealer is an adhesive that is applied and dried.

20. The rechargeable battery of claim 15, wherein the sealer is annular.

21. A rechargeable battery, comprising:
a can;
a safety vent to couple with the can, the safety vent having a top surface, a bottom surface and a side surface;
a gasket interposed between the can and the safety vent, the gasket having horizontal and vertical surfaces; and
a sealing member interposed between the safety vent and the gasket,
wherein the sealing member forms a seal and strengthens the attachment between the safety vent and the gasket and contacts only the bottom surface of the safety vent and contacts a horizontal surface of the gasket.

* * * * *